July 5, 1960
G. S. LYTLE ET AL
2,943,539
TILE ACCUMULATING, COUNTING, STACKING AND SQUARING MACHINE
Filed Aug. 31, 1956
13 Sheets-Sheet 1
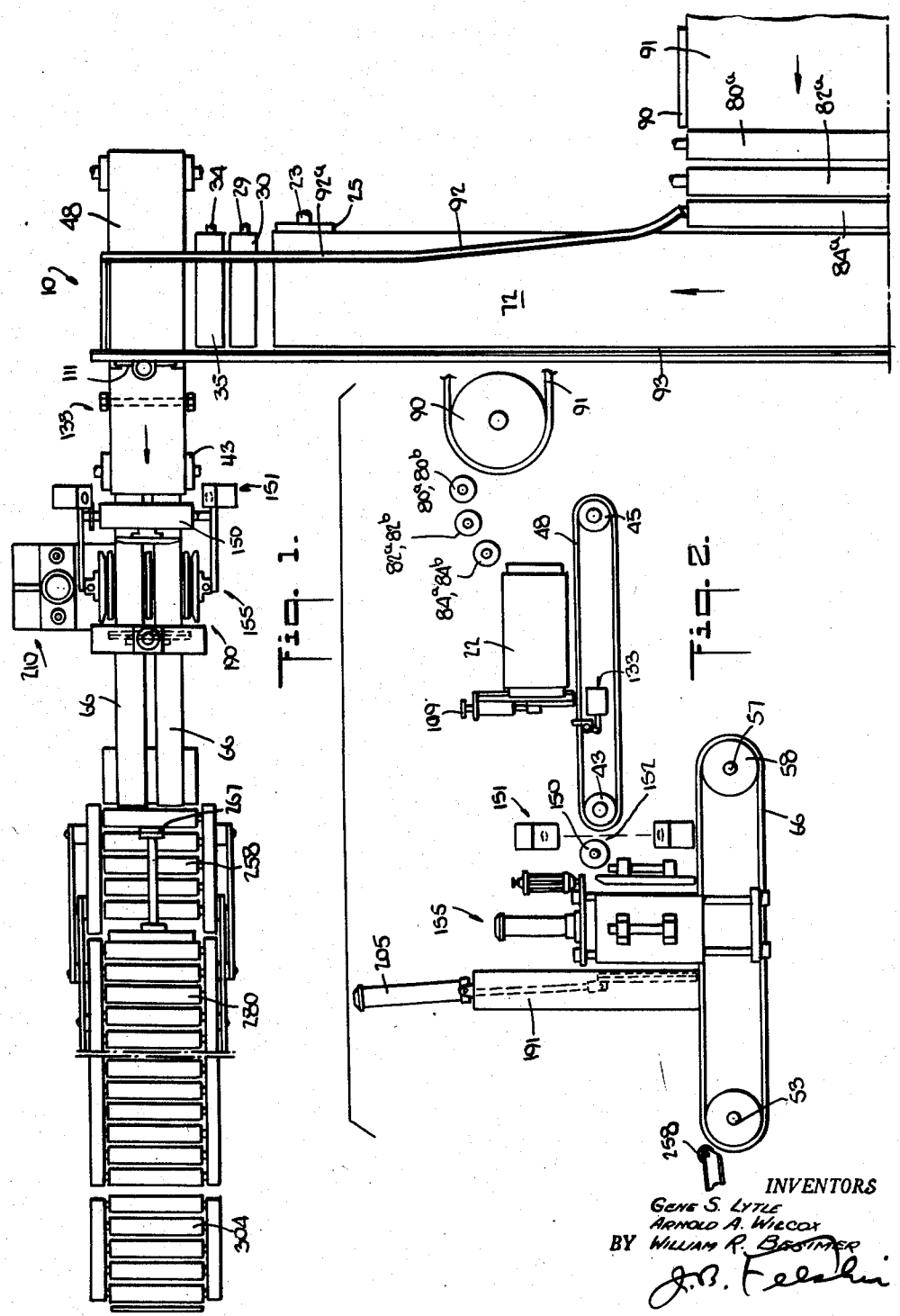
INVENTORS
GENE S. LYTLE
ARNOLD A. WILCOX
BY WILLIAM R. BESTMER
ATTORNEY

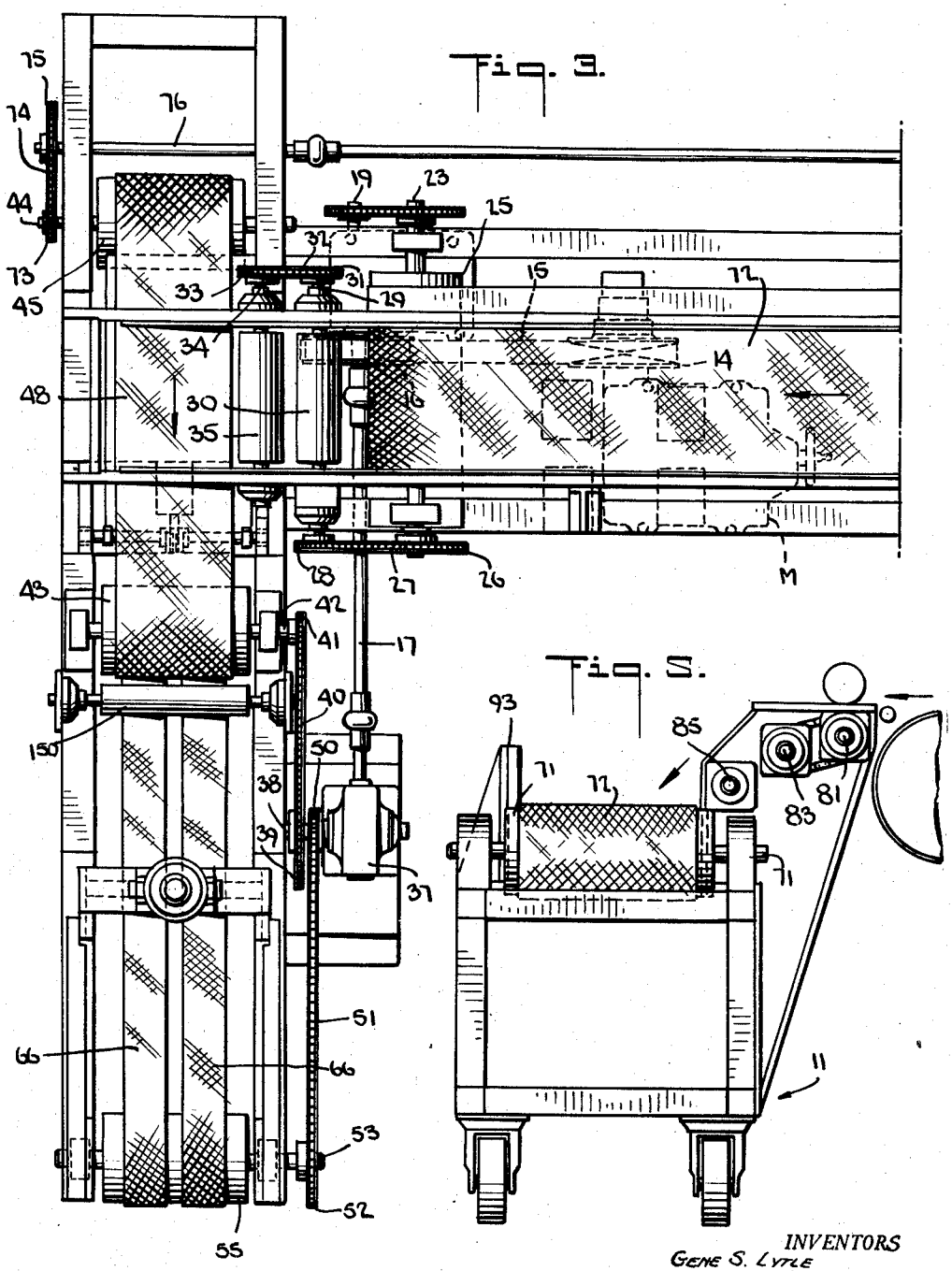

July 5, 1960 G. S. LYTLE ET AL 2,943,539
TILE ACCUMULATING, COUNTING, STACKING AND SQUARING MACHINE
Filed Aug. 31, 1956 13 Sheets-Sheet 3
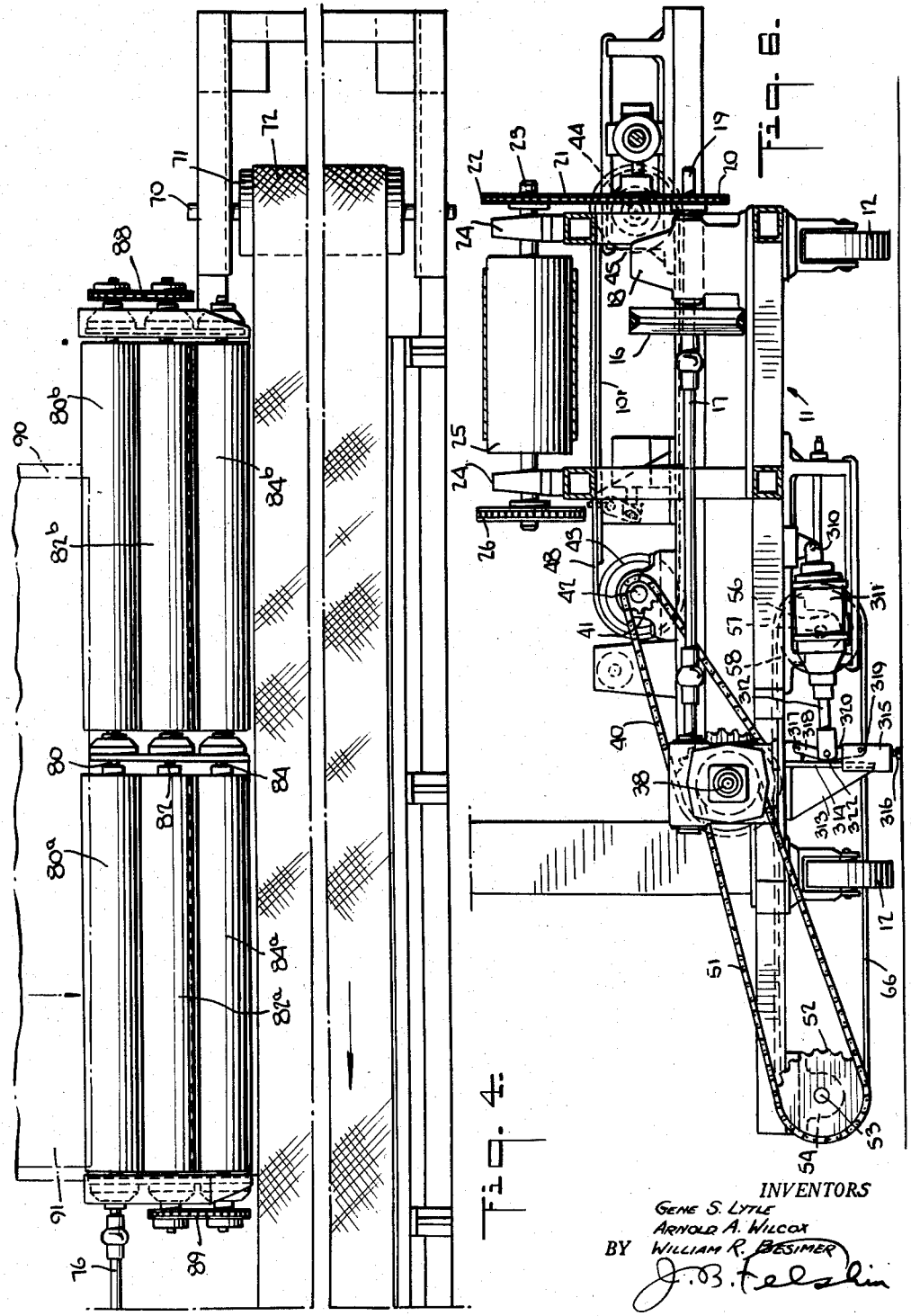
INVENTORS
GENE S. LYTLE
ARNOLD A. WILCOX
BY WILLIAM R. BESIMER
J. B. Felshin
ATTORNEY

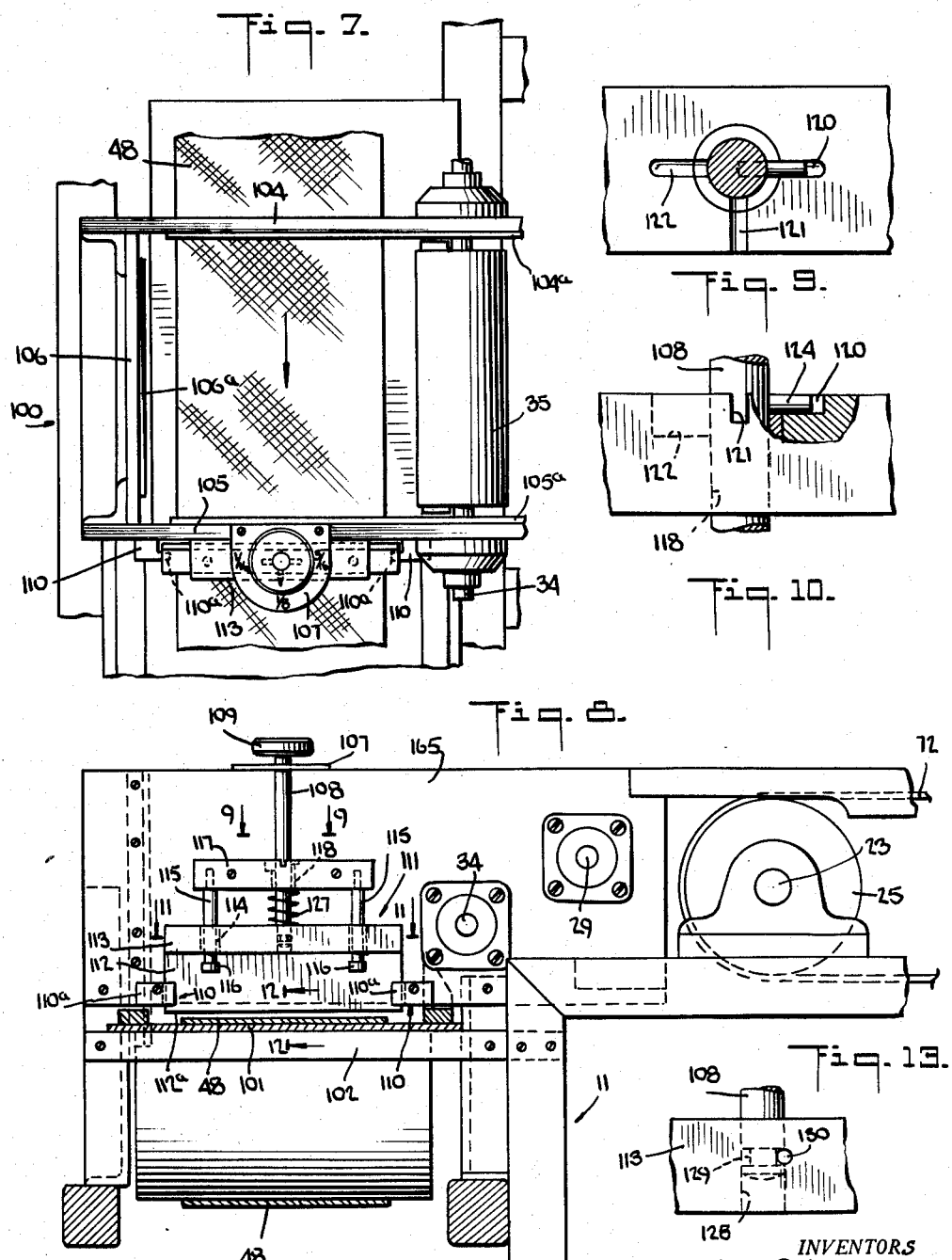

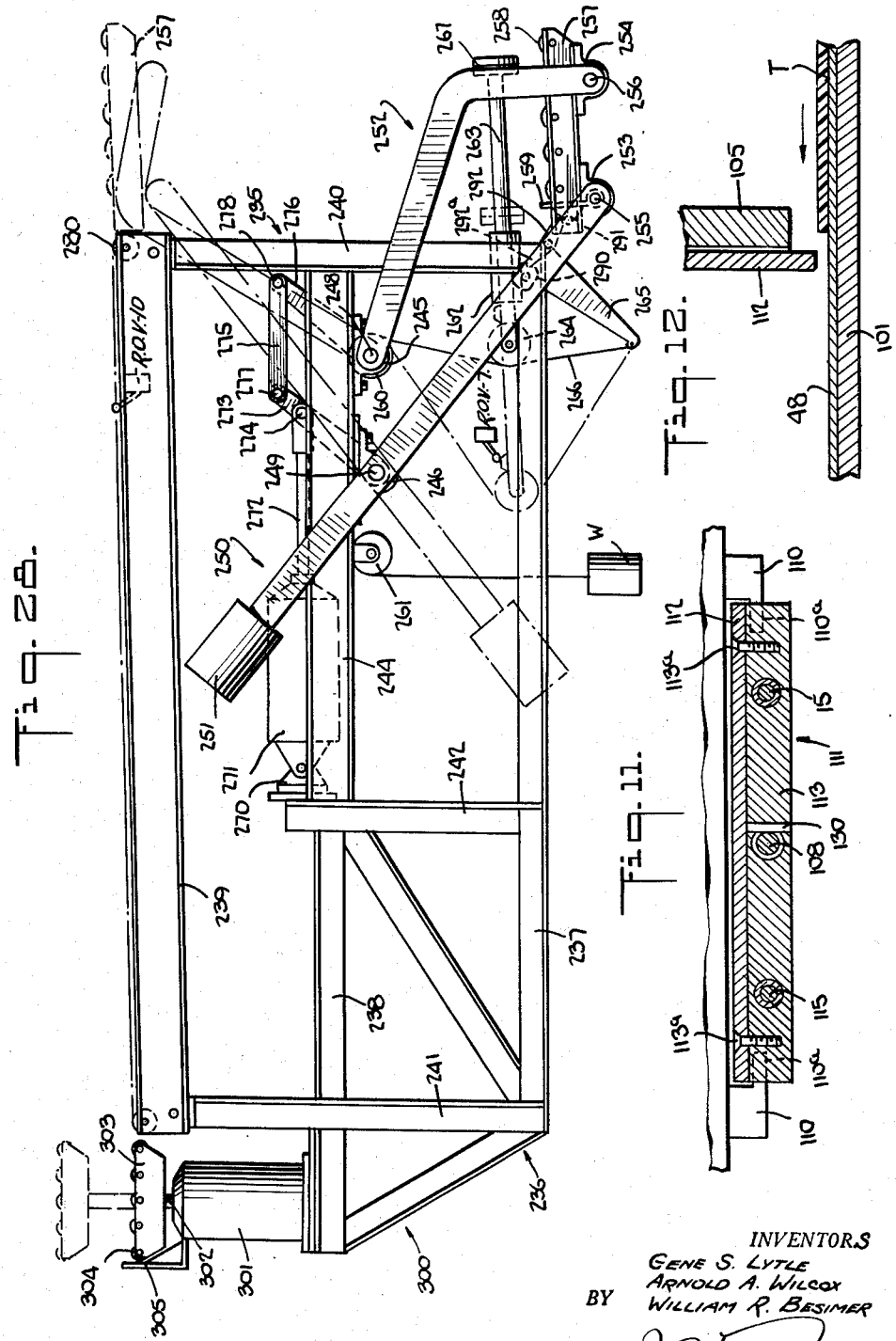

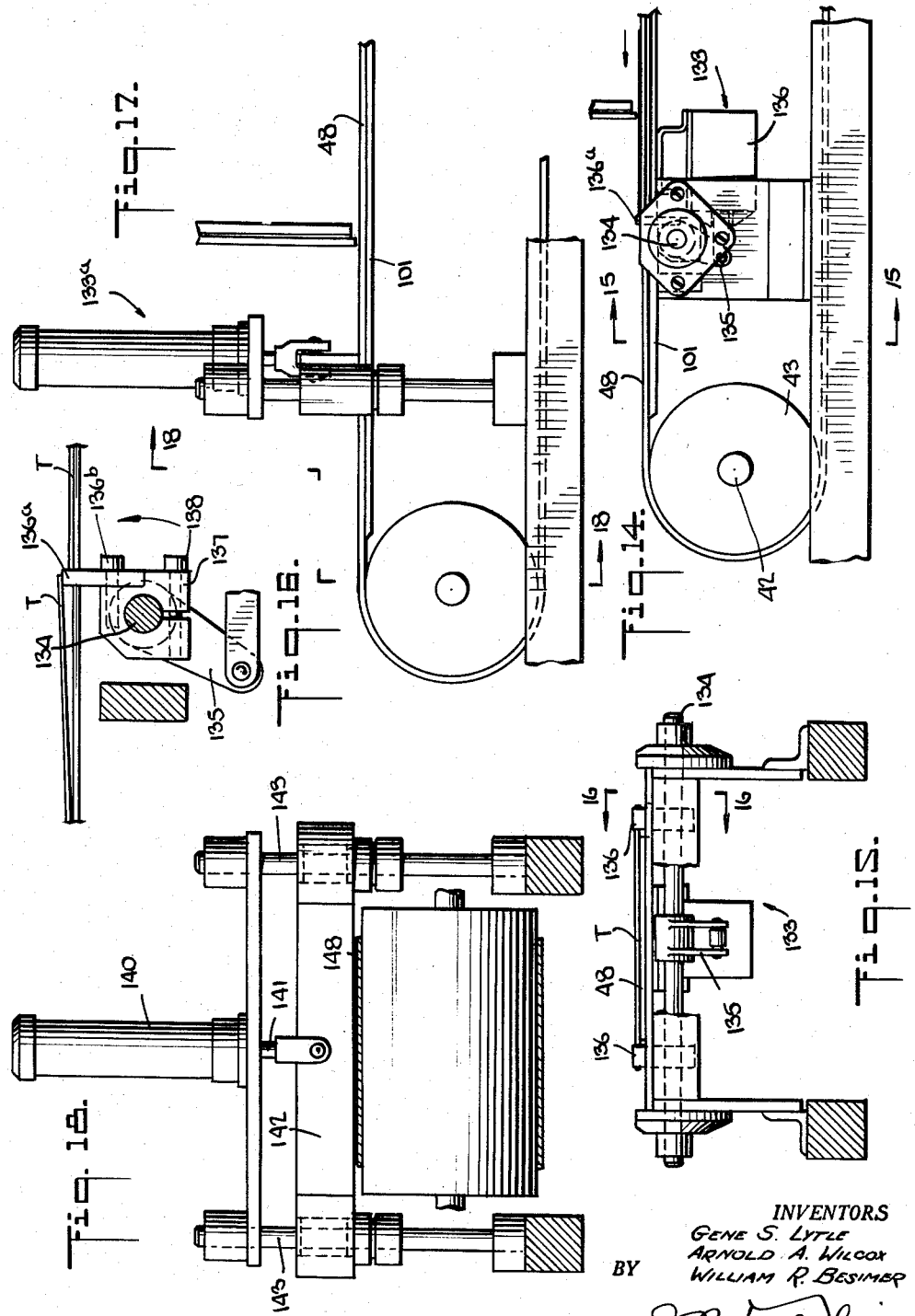

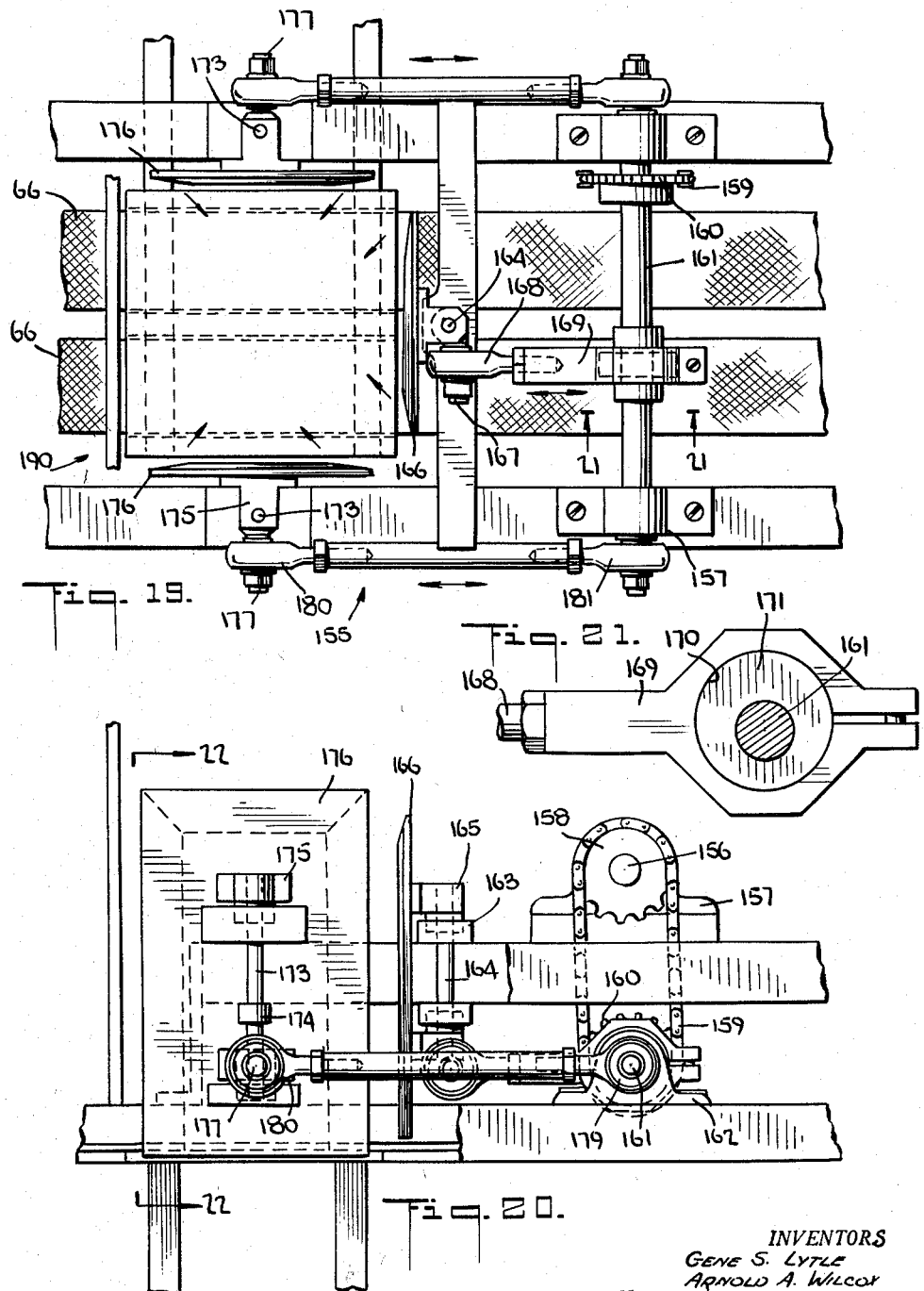

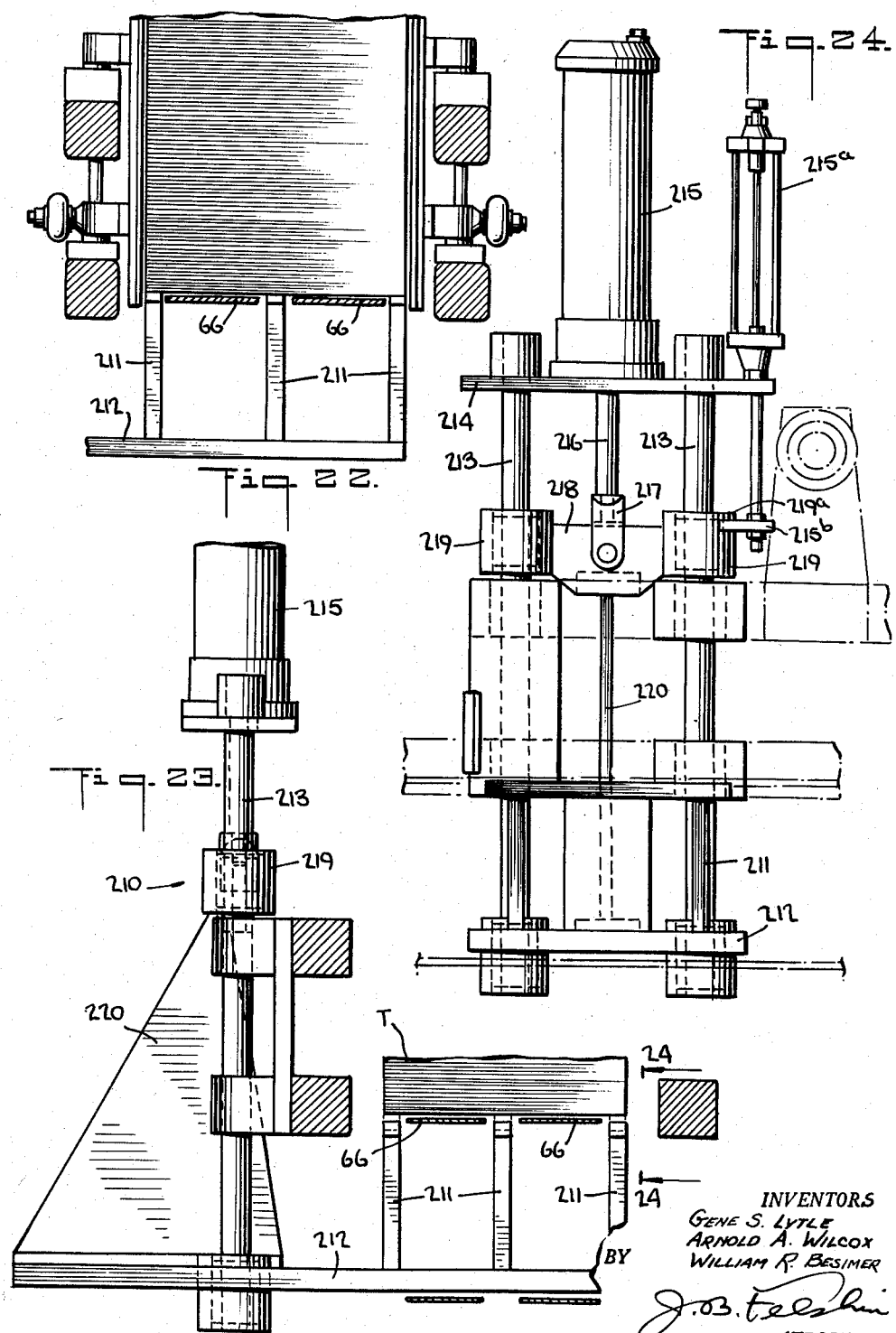

July 5, 1960 G. S. LYTLE ET AL 2,943,539
TILE ACCUMULATING, COUNTING, STACKING AND SQUARING MACHINE
Filed Aug. 31, 1956 13 Sheets-Sheet 9
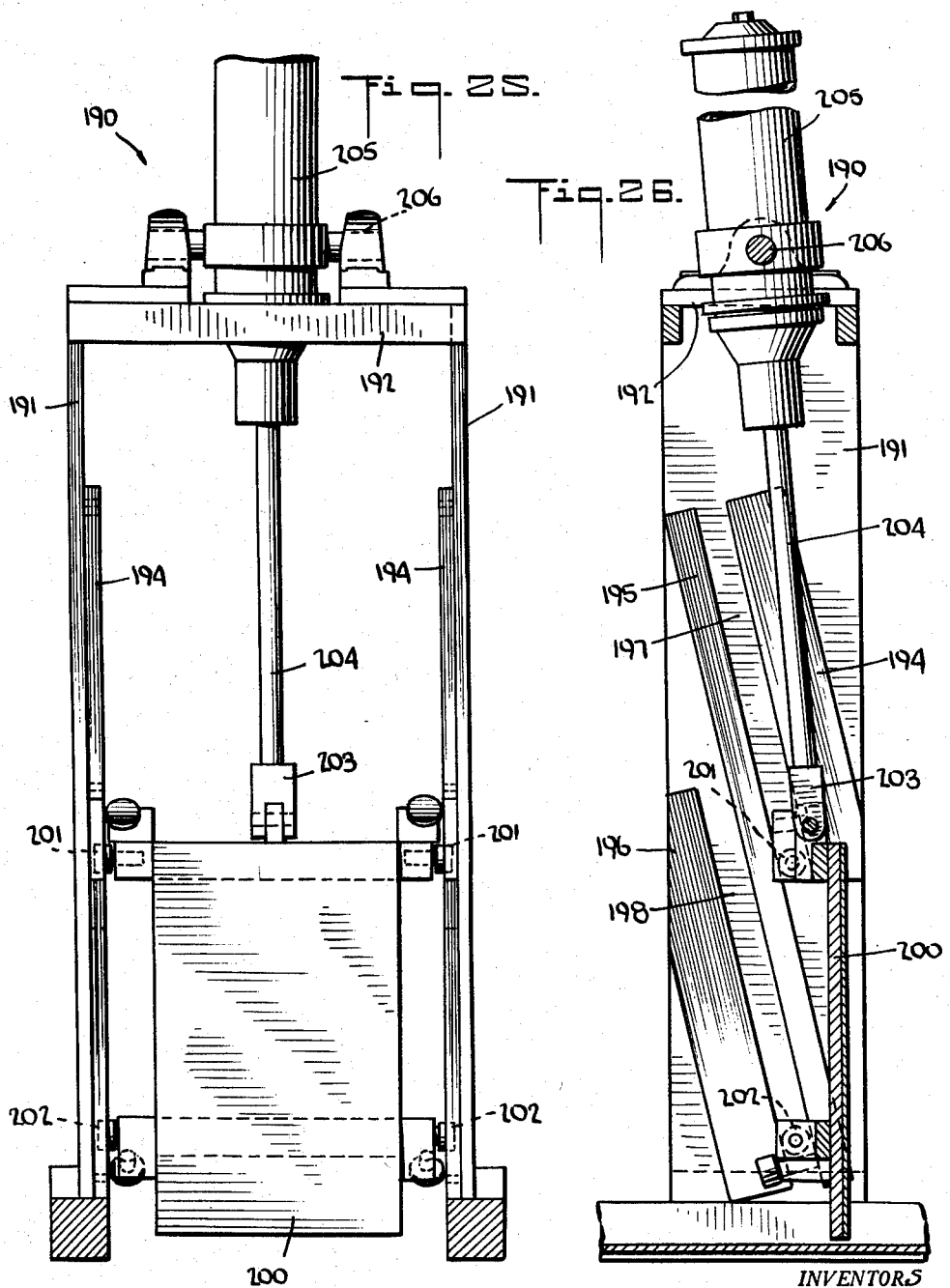
INVENTORS
GENE S. LYTLE
ARNOLD A. WILCOX
BY WILLIAM R. BESIMER
ATTORNEY

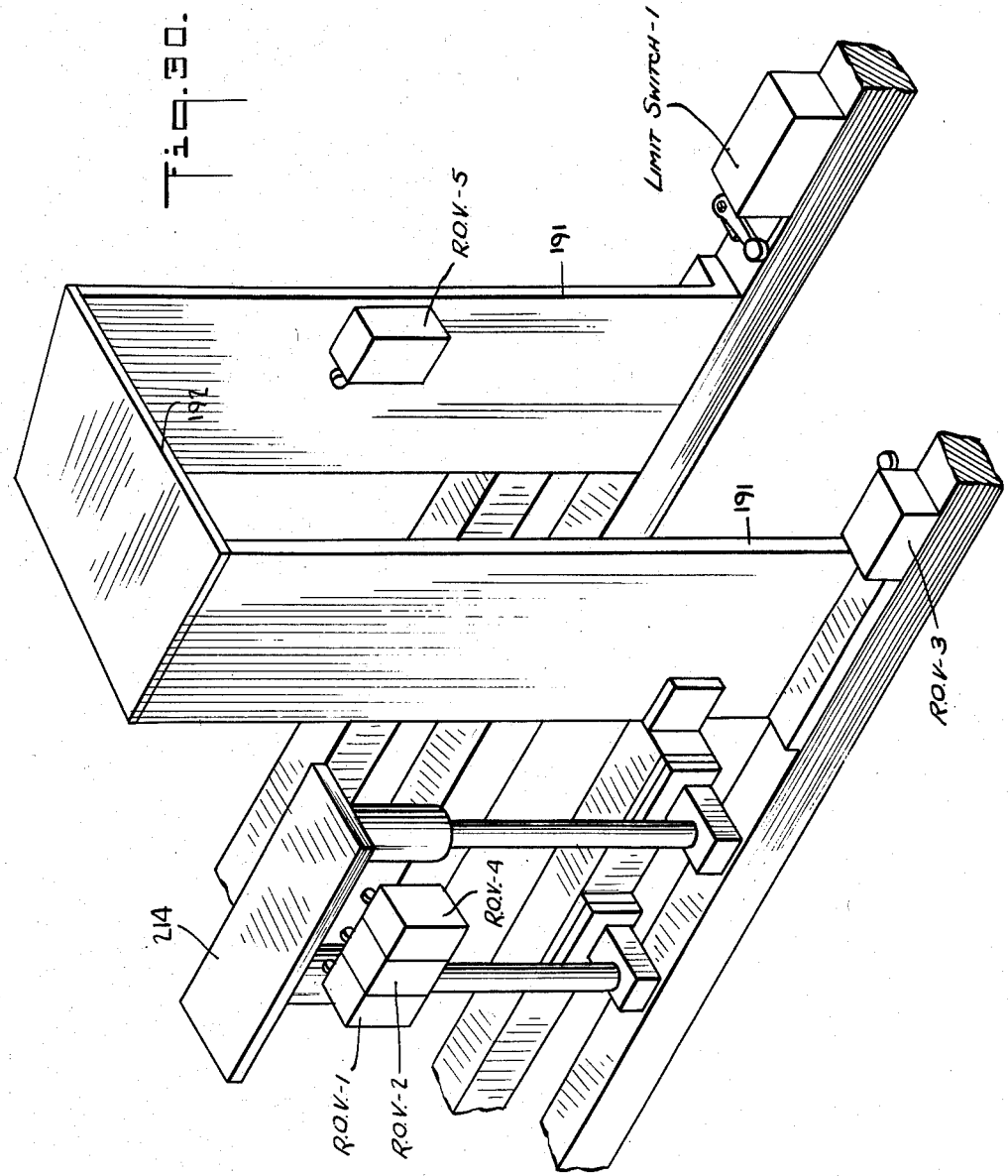

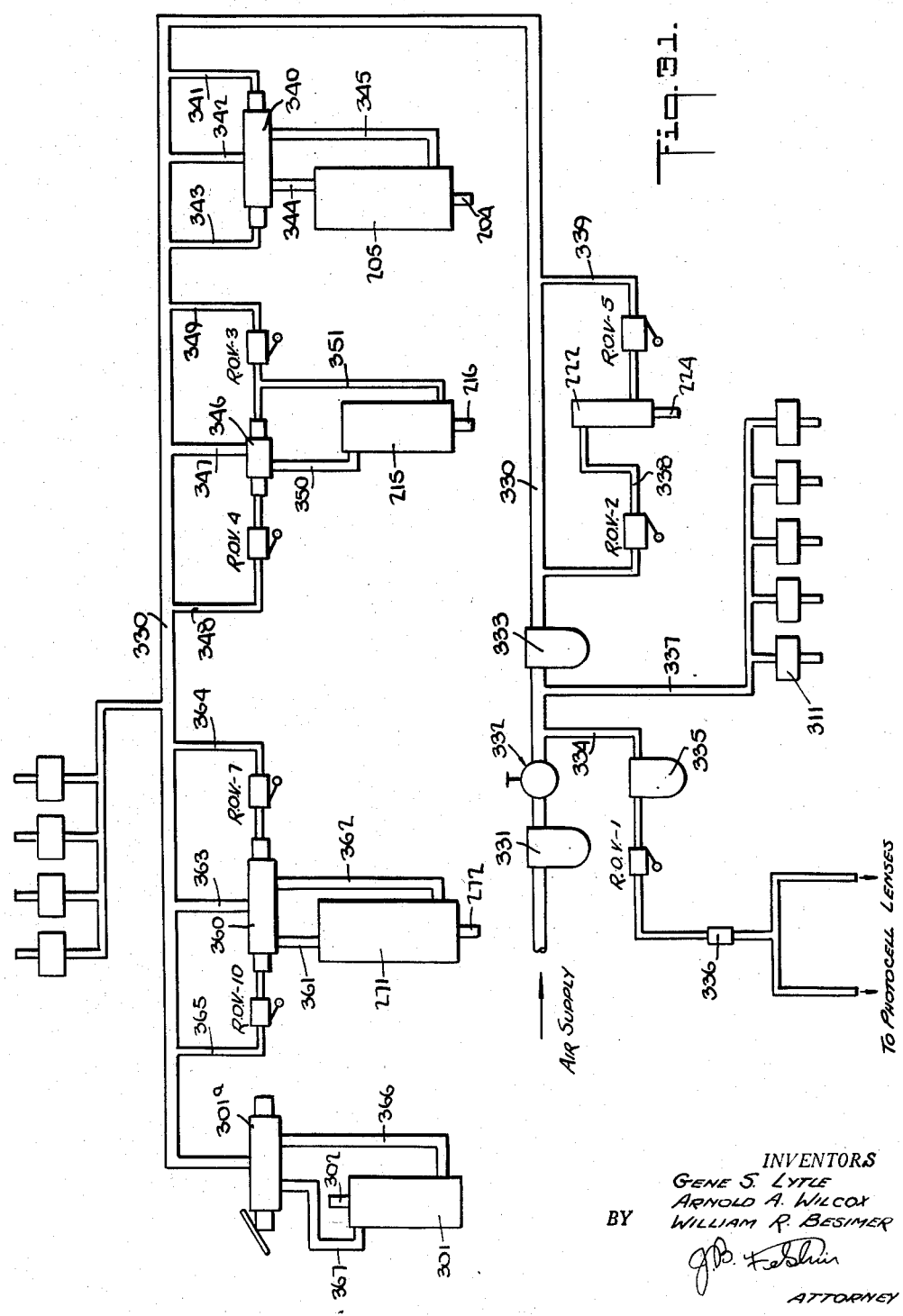

July 5, 1960   G. S. LYTLE ET AL   2,943,539
TILE ACCUMULATING, COUNTING, STACKING AND SQUARING MACHINE
Filed Aug. 31, 1956   13 Sheets-Sheet 13
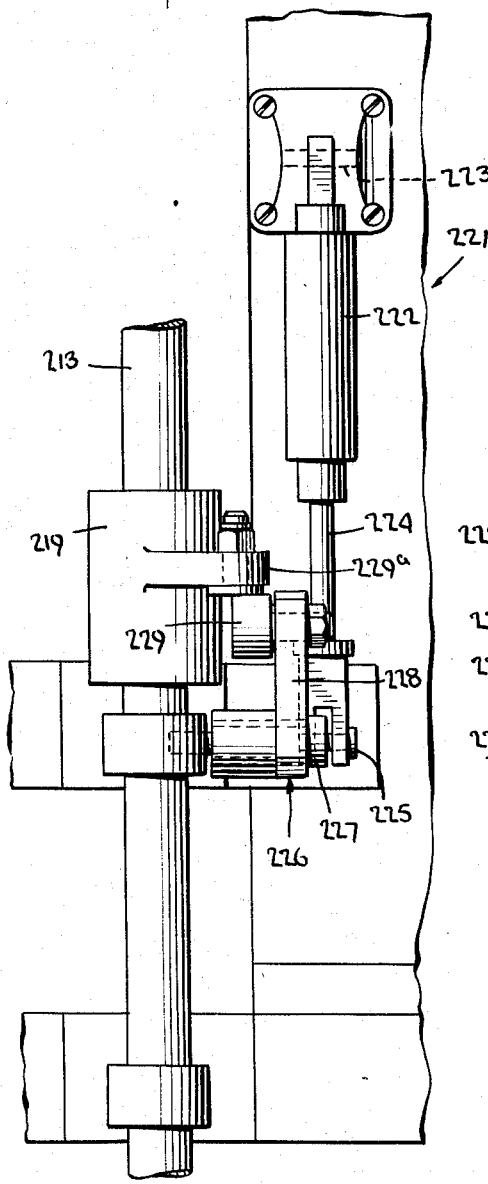
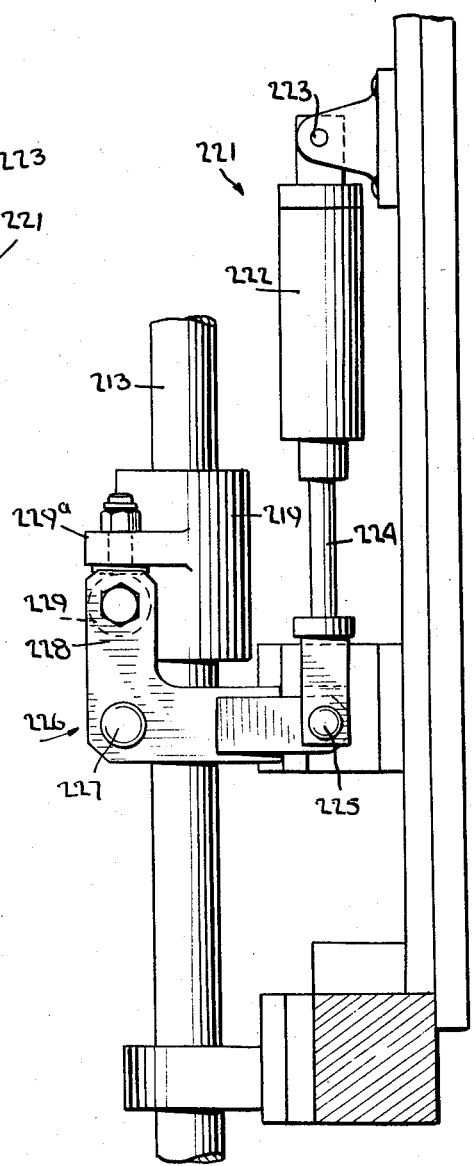
INVENTORS
GENE S. LYTLE
ARNOLD A. WILCOX
WILLIAM R. BESIMER
BY
J. B. Feldman
ATTORNEY United States Patent Office 2,943,539
Patented July 5, 1960

2,943,539
TILE ACCUMULATING, COUNTING, STACKING, AND SQUARING MACHINE

Gene S. Lytle, New Windsor, N.Y., Arnold A. Wilcox, Whittier, Calif., and William R. Besimer, Joliet, Ill., assignors to Mastic Tile Corporation of America, Newburgh, N.Y., a corporation of New York Filed Aug. 31, 1956, Ser. No. 607,454

24 Claims. (Cl. 93—93)

This invention relates to tile accumulating, counting, stacking and elevating machines.

An object of this invention is to provide a machine having means to continuously stack tile at an accumulator station, means to pass the tiles one at a time from the bottom of the stack, a stacking station, means for counting the tiles as they are moved from the accumulator station to said stacking station, and block gate means to automatically stop the passage of tiles from the accumulator station to the stacking station when a predetermined number of tiles have been deposited at the stacking station.

Another object of this invention is to provide in a machine of the character described, highly improved discharge gate means to permit passage of the counted stack of tiles out of said stacking station automatically, upon said predetermined count being reached.

A further object of this invention is to provide in a machine of the character described, means dependent upon passage of a counted stack of tiles beyond the stacking station to again start the passage of tiles from the accumulator station to the stacking station.

Yet a further object of this invention is to provide in a machine of the character described, a supporting frame structure supported on wheels, and air operated jacks to lift the supporting structure and the wheels off the floor when the machine is in operation.

A still further object of this invention is to provide in a machine of the character described, an elevator adapted to receive the stacks of tiles from the stacking station, and means controlled by movement of each stack of tiles onto the elevator for raising the elevator.

Still a further object of this invention is to provide in a machine of the character described, a gravity fed conveyor to receive the stack from the raised elevator for bringing the stack to a packing station, and an elevator at the packing station to raise the stack at the packing station to facilitate placing a carton on the stack.

Still another object of this invention is to provide in a machine of the character described a belt conveyor at the stacking station, fingers at the stacking station adapted to be raised above the belt conveyor to support the tiles as they are being stacked and counted at said stacking station, and means controlled by the counting means for the tiles, to lower the fingers to permit the stack to come down onto the conveyor so that the stack may be moved by said conveyor out of the stacking section.

Yet another object of this invention is to provide in a machine of the character described, means controlled by an air operated cylinder for moving the finger support at the stacking station, and an air operated cylinder for controlling means for locking the finger support, and roller operated valve means for controlling said cylinders.

Still a further object of this invention is to provide in a machine of the character described, means for continuously feeding tiles onto a conveyor at an accumulator station, one at a time to form a stack, block gate means to retain the stack of tiles at the accumulator station, a second conveyor, a stacking station at said second conveyor, the first conveyor being adapted to move the tiles one at a time from the bottom of the stack at the accumulator station to the stacking station when the block gate means is raised, fingers movable from below the second conveyor to above the second conveyor to support the stack of tiles above the second conveyor at the stacking station, a discharge gate at the stacking station to retain the stack of tiles in the stacking station from moving out of said station, means to count the tiles as they pass from the accumulator station to the stacking station, and means controlled by the counting means to close the block gate means and raise the discharge gate means, and move the fingers downwardly, whereby to permit the stack of tiles at the stacker station to come down on the second conveyor and be moved thereby out of the stacking station while further passage of tiles from the accumulator station to the stacking station is blocked.

A still further object of this invention is to provide in a machine of the character described highly improved means for squaring the stack of tiles at the stacking station.

Yet another object of this invention is to provide a strong, rugged and durable machine of the character described which shall be relatively inexpensive to manufacture, which shall be smooth and positive in operation, and practical and efficient to a high degree.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a top plan view of a machine embodying the invention;

Fig. 2 is a partial side elevational view thereof;

Fig. 3 is a partial top plan view of the machine embodying the invention and illustrating part of the transmission;

Fig. 4 is a top plan view of a part of the machine, and is an extension of the drawing of Fig. 3;

Fig. 5 is a side elevational view of the structure shown in Fig. 3;

Fig. 6 is a side elevational structure of the drawing shown in Fig. 3 taken at right angles to Fig. 5;

Fig. 7 is a partial top plan view of the accumulator section and adjustable accumulator release gate;

Fig. 8 is a vertical cross-sectional view of the accumulator section shown in Fig. 7;

Fig. 9 is an enlarged cross-sectional view taken on line 9—9 of Fig. 8;

Fig. 10 is a front elevational view of the structure shown in Fig. 9 with the parts in cross section;

Fig. 11 is a cross-sectional view taken on line 11—11 of Fig. 8;

Fig. 12 is a cross-sectional view taken on line 12—12 of Fig. 8;

Fig. 13 is a front enlarged detailed view of a portion of the structure shown in Fig. 8;

Fig. 14 is a side elevational view illustrating the air operated block gate;

Fig. 15 is a cross-sectional view taken on line 15—15 of Fig. 14;

Fig. 16 is a cross-sectional view taken on line 16—16 of Fig. 15;

Fig. 17 is a view similar to Fig. 14 and illustrating a modified form of air operated block gate;

Fig. 18 is a cross-sectional view taken on line 18—18 of Fig. 17;

Fig. 19 is a top plan view of the stacker and squaring section;

Fig. 20 is a side elevational view of the structure shown in Fig. 19;

Fig. 21 is a cross-sectional view taken on line 21—21 of Fig. 19;

Fig. 22 is a cross-sectional view taken on line 22—22 of Fig. 20;

Fig. 23 is a side elevational view illustrating the air operated support finger assembly;

Fig. 24 is a view taken on line 24—24 of Fig. 23;

Fig. 25 is a front elevational view of the air operated stacking section release gate;

Fig. 26 is a vertical cross-sectional view of the structure in Fig. 25;

Fig. 28 is a side elevational view of the elevator;

Fig. 30 is a perspective view of the stacker section illustrating the positions of the limit switch and the roller operated valve;

Fig. 31 is a diagrammatic view illustrating the pneumatic system for the machine;

Fig. 32 is a side view of the support finger stop; and

Fig. 33 is a front view thereof.

The conveyor system

Figure 29:
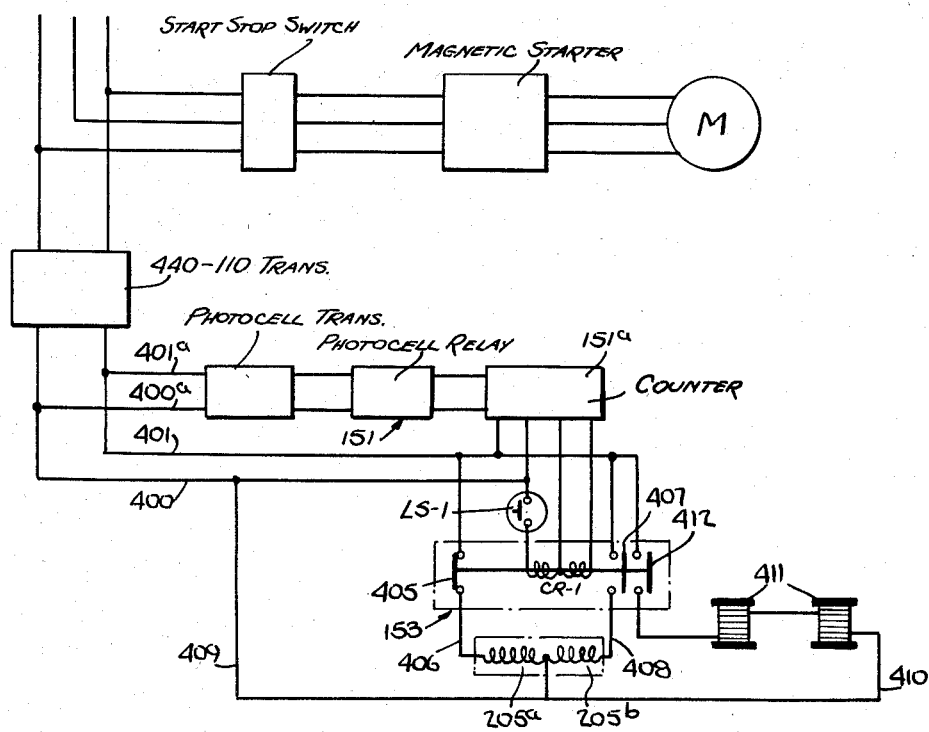
Fig. 29 is a wiring diagram for the drive motor counting photocell, discharge gate clearing photocell and the solenoids which control the block gate, the discharge gate, the finger support and the elevator.

Referring now in detail to the drawing, 10 designates a tile accumulating, counting, stacking and elevating machine embodying the invention. The same comprises a supporting frame or stand 11 supported on wheels 12. On the stand 11 is an electric motor M (Fig. 3), connected through a variable speed pulley 14 and belt 15 to a pulley 16. The pulley 16 is mounted on a horizontal shaft 17 extending into a gear box 18 (Fig. 6) from which there extends a shaft 19. On shaft 19 is a sprocket wheel 20 connected by sprocket chain 21 to a sprocket wheel 22 on the shaft 23 supported in bearings 24 on the stand 11. On shaft 23 is a roller 25. At the end of the shaft 23 opposite the sprocket wheel 22 is a sprocket wheel 26 connected by sprocket chain 27 (Fig. 3) to a sprocket wheel 28 on a shaft 29. Shaft 29 carries a roller 30 (Fig. 1).

At the side of the shaft 29 opposite the side which carries the sprocket wheel 28 is a sprocket wheel 31 connected by sprocket chain 32 (Fig. 3) to a sprocket wheel 33 on the shaft 34 carrying a roller 35.

Shaft 17 is connected through gearing in a gearing box 37 (Figs. 3 and 4) to a shaft 38 at right angles to the shaft 17. On shaft 38 is a sprocket wheel 39 connected by a sprocket chain 40 to a sprocket wheel 41 on shaft 42. Shaft 42 carries a roller 43. The gearing box 37 and the shafts 38 and 42 are supported on a stand 11 in any suitable manner. On the stand 11 there is mounted, in any suitable manner, a shaft 44 disposed at the same horizontal level and parallel to the shaft 42 and carrying a roller 45. The rollers 43 and 45 carry a horizontal belt 48.

Also carried by the shaft 38 is a sprocket wheel 50 connected by sprocket chain 51 to a sprocket wheel 52 on a shaft 53 supported by bearings 54 mounted on the frame 11. Carried by the shaft 53 is a roller 55. Attached to the frame 11 are bearings 56 supporting a shaft 57 at the horizontal level of and parallel to the shaft 53 and carrying a roller 58. The rollers 55 and 58 are interconnected by a pair of spaced belts 66. It will be noted that the belt 66 is disposed below the belt 48 and extends therebeyond.

Supported on the stand is a shaft 70 (Fig. 4) parallel to and at the horizontal level of the shaft 23 and carrying a roller 71. The rollers 25 and 71 are interconnected by a belt 72. On a shaft 44, at the outer side thereof is a sprocket wheel 73 (Fig. 3) connected by sprocket chain 74 to a sprocket wheel 75 on one end of an elongated shaft 76 suitably supported on stand 11. It will be noted that the shaft 76 is disposed at right angles to the shafts 23 and 70. Mounted on the stand 11 in any suitable manner, alongside the belt 72 are shafts 80, 82 and 84 carrying rollers 80a, 80b; 82a, 82b and 84a and 84b, respectively. The shaft 80 is connected in alignment to the shaft 76. The shaft 82 is disposed parallel to the shaft 80, and therebelow, and closer to the belt 72. The shaft 84 is in alignment and parallel to the shaft 82 and disposed therebelow and still closer to the belt 72. The shafts 80, 82 carry sprocket wheels interconnected by a sprocket chain 88 at the end remote from shaft 76. The shafts 82, 84 carry sprocket wheels interconnected by a sprocket chain 89 at the opposite end.

It will now be observed that the motor M drives the shaft 17, which in turn drives the belts 66 and 48. The shaft 19 also driven through motor M drives the belt 72. Rotation of the shaft 44 causes rotation of the shaft 76 and hence rotation of the rollers 80a, 80b, 82a, 82b, 84a, 84b.

Supported in any suitable manner is a roller 90 parallel to and adjacent rollers 80a, 80b and over which passes a belt 91 (Figs. 1 and 4). The opposite end of the belt may be supported on another roller and may be motivated by a separate motor. Thus, tiles moving in a direction of the arrow shown in Fig. 4 on belt 91 will move over the rollers 80a, 80b, 82a, 82b, 84a, 84b onto the belt 72. The tiles will then move in the direction of the arrow shown in Fig. 4 by belt 72 over the rollers 30 and 35 down onto the belt 48 within an accumulator station to be described hereinafter. Suitable fixed guides 92 and 93 above the belt 72 serve to guide the tiles to said accumulator station.

The rollers 30, 35 may be designated as the accumulator infeed rolls. The guide 92 will be termed the infeed squaring guide. Belt 48 is the accumulator conveyor. The belt 91 will be termed the main supply conveyor. The rollers 80a—84b may be termed the cross conveyor infeed rolls. The belt 72 may be termed the cross conveyor. The guide 93 may be termed the infeed stacker guide.

The accumulator has incorporated therewith an air operated adjustable accumulator release gate. The accumulator and the adjustable accumulator release gate are illustrated in more detail in Figs. 7–13 inclusive. This accumulator apparatus is designated by numeral 100.

The accumulator

Supporting the underside of the upper run of the belt 48 is a flat plate 101 (Fig. 8) supported on cross bars 102 fixed to the frame 11. Fixed to the frame 11 and disposed in alignment with a portion 92a of the guide 92, parallel to the guide 93 is a vertical wall 104 disposed above and crossing the belt 48. The guide 93 has an extension 105 extending vertically and parallel to the wall 104. The outer ends of the walls 104, 105 are interconnected by a vertical outer wall 106 perpendicular to the walls 104, 105.

It will now be understood that tiles moving on belt 72 will pass over rollers 30 and 35 and drop down on a portion of the belt 48 between the walls 104, 105. The tiles will strike the wall 106 so that they cannot go any further. Plate 106 is hence a striker plate. Facing members 104a, 105a and 106a may be attached to the inner surfaces of the guide walls 104, 105 and striker plate 106.

Attached to the top of member 105 is a plate 107 formed with a central opening through which passes a vertical rod 108 provided with a hand wheel 109 above said plate 107.

Fixed to the outer side of plate 105 are a pair of L-shaped clamps 110 having inwardly extending fingers 110a. Guided by the figers 110 for up and down movement is an L-shaped member 111 having a vertical wall 112 and an outwardly extending horizontal extension 113 fixed thereto as by screws 113a. The fingers 110a engage the vertical wall 112. The vertical extension 113 is formed with a pair of vertical through openings 114. Extending through the openings 114 are rods 115 having heads 116 at their lower ends. The upper ends of the rods 115 are fixed to a horizontal cross bar 117 formed with a central through opening 118 through which the rod 108 passes. In the upper end of the bar 117 are three radial slots 120, 121 and 122 disposed at right angles to one another. Said slots extend radially from the through opening 118. The slot 120 is shallowest. The slot 121 is deeper and the slot 122 is still deeper.

Fixed to rod 108 is a radial pin 124 which may be selectively fitted into one of the slots 120, 121 and 122. Interposed between portion 113 and L-shaped member 111 and the bar 117 and surrounding the rod 108 is a compression spring 127. Said portion 113 is formed with a central vertical through opening 128 (Fig. 13) into which the lower end of the rod 108 fits. Said rod 108 is formed at its lower end with an annular groove 129. A transverse pin 130 driven through said portion 113 enters the slot 129. Thus, the rod 108 may rotate relative to member 111 but will move said member 111 up and down therewith. The lower edge 112a of member 111 is spaced above the upper run of the belt 48. By adjusting the height of member 111 the thickness of tile which may pass through between member 111 and the belt 48 may be adjusted. It will thus be seen that member 111 is an adjustable accumulator release gate.

By grabbing the wheel 109, pulling it up and turning the wheel, the finger 124 may be caused to lodge in any one of the three slots 120, 121 and 122 to adjust the heighth of the accumulator release gate. Thus, as tiles accumulate in the accumulator when the belt 48 is moving, the tiles at the bottom of the pile are moved outwardly of the accumulator by the belt 48 one at a time.

The block gate

Mounted beyond the accumulator release gate is an air operated block gate 133 shown in detail in Figs. 14, 15 and 16.

The purpose of the air operated block gate is to stop passage of tile from the accumulator station in a predetermined sequence in the operation of the machine, as will appear hereinafter. Said block gate 133 comprises a transverse shaft 134 located beneath the plate 101 which supports the upper run of the belt 48. Fixed to the center of the shaft is a crank arm 135 connected to the piston of an air cylinder 136. Said air cylinder is controlled by a block gate solenoid (see the wiring diagram of Fig. 29). Fixed for rotation with the shaft 134 are a pair of plates 136a on opposite sides of the belt 48. When the solenoid is energized, the crank 135 is rotated in a clockwise direction looking at Fig. 14, bringing the upper ends of the plates 136 above the belt 48 and into position for engaging the forward edge of a forwardly moving tile T. In such position further movement of the tiles is prevented. When the solenoid is de-energized the crank 135 is rotated in a counterclockwise direction bringing the upper edges of the plates 136a below the upper surface of the belt 48 permitting the belt to move tiles forwardly in the direction of the arrow shown in Fig. 14. The plates 136a are fixed by bolts 136b to a split clamp 137 fixed to the shaft 134 as by bolts 138.

A modified form of air operated block is illustrated in Figs. 17 and 18. In said figures the air operated block gate 133a replaces the block gate 133 in Figs. 14, 15 and 16. The air operated block gate 133a comprises a cylinder 140 having a piston 141 supporting a cross bar 142 supported on suitable guide rods 143. The cylinder 140 is also controlled by a block gate solenoid which when energized brings bar 142 downwardly to stop further movement of tiles. When the block gate solenoid is de-energized, the bar 142 is lifted to permit the tiles to be moved by the belt 48 in the direction of the arrow shown in Fig. 17 toward a stacker section, as will appear hereinafter.

The counter

Figure 27:
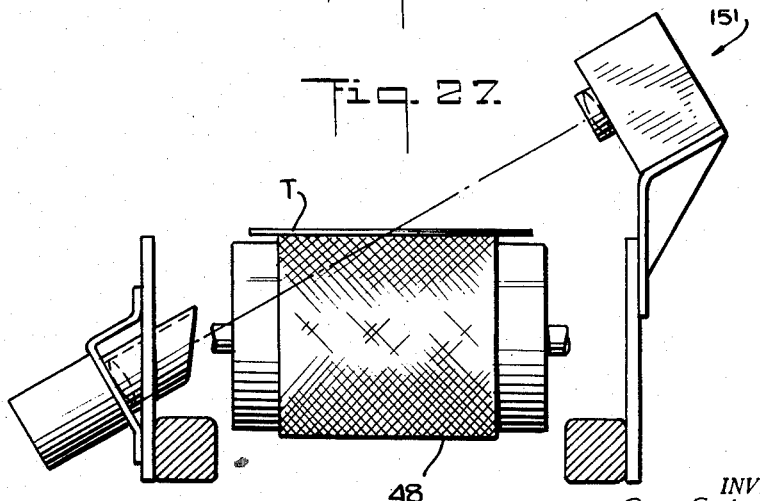
Fig. 27 is a side elevational view of the counting photocell.

Located in advance of the roller 43 and supported by the frame is an idler roller 150 (Fig. 2). There is space between the roller 150 and the belt 48, as shown in Fig. 2 of the drawing. Located at said space is a counting photocell 151. The counting photocell may be constructed as shown in Fig. 27 and is arranged to throw a light diagonally through the space 152 between the belt 48 and the roller 150. Thus, each time a tile passes from the belt 48 over the roller 150, a count will be made on the counting photocell 151. The counting photocell (Fig. 29) may include a counter stepping switch 151a so arranged that when a predetermined set count is made, coil CR–1 (Fig. 29) is energized to pull move the multiple switch 153. It will be noted that one end of the belt 48 overlaps an adjacent end of the belt 66 (Fig. 2). The counting photocell 151 is located above the belt 66 and so is the roller 150.

Squaring and stacking station

Mounted over the belt 66 in advance of the roller 150 is a squaring and stacking station 155 (Figs. 1, 19, 20 and 21). Said stacking and squaring station 155 comprises a transverse shaft 156 supported on suitable bearing 157 on a frame 11. Said shaft is disposed above the spaced belts 66. On shaft 156 is a sprocket wheel 158 connected by sprocket chain 159 to a sprocket wheel 160 on a shaft 161 supported by bearings 162. Fixed to the frame are vertical bearings 163 supporting central vertical shaft 164. Mounted on the upper and lower ends of the shaft 164 are brackets 165 supporting a vertical transverse plate 166. Extending from shaft 164 to one side thereof is a crank arm 167. Journalled on the crank arm is a bearing 168 attached to clamp 169 formed with an opening 170. Journalled with the opening 170 is a disc 171 eccentrically mounted with respect to the shaft 161. Any suitable power may be provided for rotating the shaft 156 and hence for rotating the shaft 161, which in turn will cause a horizontal reciprocatory movement of member 169, thereby causing oscillation of the arm 171 and hence a vibratory oscillation of the vertical shaft 164 thereby vibrating the squaring plate 166.

Mounted for rotation on opposite sides of the belt 66 are a pair of vertical shafts 173 journalled in brackets 174. Fixed to the shaft 173, as by arms 175, are a pair of spaced, opposed squaring plates 176. Fixed to each of the shafts 173 and extending outwardly therefrom is an arm 177. The outer ends of shaft 161 and arms 177 are journalled eccentrically in discs 170 journalled in rings or clamps 180 interconnected by an adjustable connecting rod 181.

It will now be understood that as the shaft 161 rotates, the shafts 173 and hence the squaring plates 176 will likewise be vibrated. The plates 166 and 176 are so located that as the tiles pass over the roll 150, they will drop between the plates 176 and just beyond the plate 166.

An air operated stacking section discharge gate 190 is located over the belt 66 in parallel opposed relation to the plate 166. This discharge gate is shown in Figs. 2, 19, 25 and 26. The discharge gate 190 comprises a pair of parallel vertical support plates 191 disposed on opposite sides of the belt 66. The upper ends of the plates 191 are interconnected by a top plate 192. Attached to the inner sides of the plates 191 are inclined guide plates 194, 195 and 196 forming parallel upwardly and outwardly inclined slots or grooves 197 and 198. A transverse vertical plate 200 carries at its upper end a pair of rollers 201 received in the opposed slots 197. Adjacent the lower end of the plate 200 are a pair of rollers 202 received in the slots 198. Attached to the plate 200, by means of a clevis 203 is a piston rod 204 which passes into an air operated cylinder 205 pivoted to the top cross member 192 of the frame by means of a cross shaft 206.

The air operated cylinder 205 is controlled by a discharge gate solenoid having two coils (Fig. 29). One of the coils is an advance coil which when energized moves the piston rod 204 downwardly to close the discharge gate and keep the tiles within the squaring and stacking station while they are being counted. When the retard coil 205b of the discharge gate solenoid is energized and the advance coil thereof is released, the piston rod 204 pulls the gate 200 upwardly to permit the stack of tiles within the stacking and squaring station to move out of said station. It will be noted that as gate 200 moves upwardly, the upper rollers 201 and the lower rollers 202 move in the inclined slots 197 and 198, respectively, keep the plate substantially vertical, moving said plate gradually away from the stack of tiles in the squaring and stacking section.

The finger support and support lock

While the tiles are being stacked in the stacking and squaring station and counted by the counting photocell 151, there is means to lift the stack up above the belt, so that the belt can move freely without moving the stack. To this end there is provided an air operated support finger assembly 210 (see Figs. 1, 22, 23 and 24).

Said air operated support finger assembly 210 comprises three vertical fingers 211. The center finger passes between the pair of belts 66. The outer fingers are disposed on the outside of the belt. These fingers are interconnected by horizontal cross member 212, disposed above the lower rows of the belt 66 to one side thereof. Fixed to the frame in any suitable manner are a pair of vertical rods 213 carrying a transverse support 124 at their upper ends. Mounted thereon is an air operated cylinder 215 from which extends downwardly a piston rod 216. The piston rod 216 is attached by means of a clevis 217 to cross members 218 having collars 219 journalled on the rods 213. Cross members 218 are connected to the bottom support 212 by means of a triangular rib 220.

The air operated cylinder 215 is controlled by roller operated valves R.O.V. 3 and R.O.V. 4 (Fig. 30) and when lowered, the stack of tiles T in the stacking station may drop down onto the upper runs of the belts 66 and when the fingers are raised they keep the stack off the belts 66. The support frame includes suitable means to limit the downward motion of the cross bar 212 which carries the lifting fingers 211.

After the discharge gate has been raised, and the fingers lowered in the manner hereinafter appearing, the counted stack of tiles will move on the belt 66 past a limit switch LS 1 (Fig. 30).

Mounted on the support 214 is a "hydro-chek" 215a for slowing down the lowering of the fingers.

Means is further provided to temporarily lock the finger support in its downward movement at a position about ½" above the belt 66. In Figs. 32 and 33 there is shown a lock 221 comprising a finger support lock cylinder 222 pivoted to a suitable frame, as at 223, provided with a piston rod 224, connected as at 225 to one arm of a bell crank 226, pivoted to the frame as at 227. Bell crank 226 has an upwardly extending arm 228 carrying a cam follower 229 adapted to engage beneath a finger 229a on one of the sleeves 219. The cylinder 222 is controlled by roller operated valves R.O.V. 2 and R.O.V. 5 (see Figs. 30 and 31).

In Fig. 30 there is illustrated the location of the roller operated valves R.O.V. 2, R.O.V. 3, R.O.V. 4 and R.O.V. 5. The roller operated valves R.O.V. 2 and R.O.V. 4 are located on the support bracket 214, as illustrated in Fig. 30. Roller operated valve R.O.V. 3 is located on the frame in position opposite to limit switch LS-1, to be actuated by the stack leaving the stacking and squaring station, likewise as shown in Fig. 30. The roller operated valve R.O.V. 5 is adjustably mounted on the vertical side member of the discharge gate support 191, as shown in Fig. 30, and is actuated by the rising discharge gate 200.

Air operated jacks

Means is provided to lift the machine so as to raise the suporting wheels 12 for the frame above the floor so that the machine does not move around while in operation. To this end there is pivoted to the underside of the frame as at 310, a plurality of air operated jack cylinders 311 having piston rods 312. Fixed to the underside of the frame are brackets 313 having vertical guide plates 314. Slidably mounted on each guide plate 314 is a block 315 to the lower end of which is screwed an adjusting screw 316. Pivoted to the bracket 313, as at 317, is one end of a link 318. Pivoted to the sliding bracket 315, as at 319, is a link 320. The links 318 and 320 are pivoted together and to the front end of the piston rod 312 as at 322.

It will now be understood that as air enters cylinders 311, the piston rods 312 will be retracted, thereby pushing down on the blocks 315 against the floor, and raising the frame to bring the wheels 12 off the floor. The jacks may be distributed as desired at different parts of the frame to support the frame. Five of such jacks may be provided for the frame 11. The pneumatic system for supplying air to the cylinders 311 will be described hereinafter, and is illustrated in Fig. 31.

The frame 236 for the elevator may be supported by four similar jacks comprising similar cylinders 311, and the air is supplied to said cylinders in the manner which will be explained hereinafter, and is illustrated in Fig. 31.

The pneumatic system for the accumulating and stacking section and elevating unit The pneumatic system for the accumulating and stacking section and for the elevating unit is illustrated in Fig. 31. Air is supplied through a main air line 330. The same may be provided with a standard filter 331 and a pressure regulator 332 and also with a lubricator 333. Extending from the pipe 330, in advance of the lubricator, is a conduit 334 passing through a fine filter 335 and through roller operated valve R.O.V. 1 and through needle valve 336 to the photocell lenses of the photocell 151.

The roller operated valve R.O.V. 1 is located on the support finger cylinder support bracket 214 and is actuated by the support finger assembly as the maximum rise is affected (Fig. 30).

Extending from the main line 330 is a conduit 337 to supply air to the diaphragm jack cylinders 311 of stand 11.

The finger support lock cylinder 222 is connected at one end by conduit 338 to the main line 330, and passes through roller operated valve R.O.V. 2. When roller operated valve R.O.V. 2 is actuated, the finger support lock cylinder 222 moves the piston rod 224 downwardly to lock the finger support against full downward movement. The opposite end of cylinder 222 is connected by conduit 339 to the main line 330 and passes through roller operated valve R.O.V. 5. When valve R.O.V. 5 is actuated, the finger support lock cylinder is retracted allowing the stacked tile to drop onto the discharge conveyer belt 66 which moves the stacked tile from the stacking and squaring section.

The discharge gate cylinder 205 is controlled by a solenoid having the coils 205a, 205b and controlling a four way valve 340. The valve 340 is connected to the main line 330 by conduits 341, 342 and 343. It is connected to one end of the cylinder 205 by conduit 344 and to the opposite end of said cylinder by conduit 345. When the solenoid 205a is energized, in a manner to be explained hereinafter, air enters the cylinder through conduit 344 to drop the discharge gate, and when the solenoid coil 205b is energized, air enters the cylinder through conduit 345 to retract or open the discharge gate.

The finger support cylinder 215 is controlled by a pilot operated two way valve 346, connected by conduit 347 directly to the air supply 330, by conduit 348 to said air supply through roller operated valve R.O.V. 4, and by conduit 349 to said air supply through roller operated valve R.O.V. 3. The valve 346 is connected to the upper end of the cylinder 215 through conduit 350. The conduit 349 is connected through conduit 351 to the lower end of the cylinder 215. Roller operated valve R.O.V. 4 actuates the two way valve 346 for advancing the finger support cylinder, lowering the fingers against the parallel coupled "hydro-chek" 215a (see Fig. 24).

The "hydro-chek" 215a is provided with a finger 215b adapted to be engaged by a finger 219a on one of the sleeves 219 to slow down the downward movement of the finger support. As the stack moves out of the stacking section, roller operated valve R.O.V. 3 is actuated, returning the two way double pilot operated valve to its normal position, thereby affecting retraction of the finger support cylinder raising the fingers in the stacking and squaring section.

The air supply 330 likewise supplies air for operating elevator cylinder 271. Cylinder 271 is controlled by a pilot operated four way valve 360. Said valve is connected by conduit 361 to one end of the cylinder 271 and is connected to the opposite end of said cylinder by conduit 362. The valve 360 is connected to the air supply 330 by conduit 363. It is also connected to said air supply by a conduit 364 passing through roller operated valve R.O.V. 7. The valve 306 is also connected by conduit 365 to the air supply 330 through roller operated valve R.O.V. 10. Thus, when roller operated valve R.O.V. 7 is actuated, air is supplied to cylinder 271 to retract the piston rod and raise the elevator 257. When roller operated valve R.O.V. 10 is actuated, air is supplied to the opposite end of the cylinder 371 to extend the piston rod 272 and lower the elevator.

Air is also supplied from air supply 330 to the diaphragm jack cylinders 311 of the elevator stand, as illustrated in Fig. 31.

Air is likewise supplied from the air supply 330 to the cylinder 301. Said cylinder 301 is controlled by a treadle operated four way valve 301a connected directly to the air supply 330. The valve 301a is connected by conduit 366 to the lower end of the cylinder 301 and by conduit 367 to the upper end of said cylinder. When air is supplied to the lower end of the cylinder, the piston rod 302 is raised for raising the lowered packing platform 303, and when air is supplied to the upper end of the cylinder, said platform is lowered.

*The electrical circuit in the tile accumulating counting and stacking machine*

The electrical circuit for the counting and stacking machine is illustrated in Fig. 29. In said figure, the motor M for operating the conveyor systems is shown connected to a power supply. The counter 151a, photocell relay and photocell transformer are connected to the leads 400, 401 by wires 400a and 401a. The relay CR-1 is so connected as to be energized when a predetermined count is reached on the counter 151a of the photocell counting mechanism 151. Interposed in one lead of the relay, is limit switch LS-1 which when open de-energizes the relay. Said relay controls a multiple switch member 153. Said switch member 153 comprises a switch 405 interposed in wire 406 connecting coil 205a with the lead 401. Switch 405 is open while tile is being counted in the stacker section, and is closed when the stack of tile leaves said section. Said switch member 153 further comprises a switch 407 interposed in wire 408 connecting coil 205b with the lead 401, and is open during the counting of the tiles in the stacker section. Lead 400 is connected by wire 409 to a point between the coils 205a, 205b. The lead 401 is connected by wire 410 to a point between said coils 205a, 205b. Interposed in the wire 410 are the block gate solenoid coils 411. Also interposed in said wire is switch 412 forming part of switch member 153 and is normally open during the counting operation.

*Operating description of automatic tile accumulating, counting, stacking, squaring and elevating machine*

The counter 151a will be actuated by impulses received from tile interrupting the photocell circuit, and is adjustable to any commercial package count. As the counter reaches a pre-set count, it energizes the control relay 153 of the machine. Further sequencing of operation is performed by a limit switch LS-1 and poppet type air valves which in turn return the circuit to the initial starting position.

The start switch on the main control panel starts all moving elements of the entire machine, and re-sets the counter to "zero" position (see Fig. 29). The air supply flexibly coupled from the supply conveyor, actuates the jack cylinders upon coupling without the use of valves. The tiles feeding into the machine actuate the counter until the pre-set count is reached, at which time the normally open contacts 407, 412 of the relay are closed. The normally open contact 412 when closed by the relay, closes the circuit to the solenoids 411 thereby operating the block gate, preventing further discharge of tile from the accumulator. The other normally open contact 407, when closed, actuates the retract solenoid 205b, affecting the opening of the discharge gate.

As the discharge gate opens, the roller operated valve R.O.V. 5 is actuated which retracts the finger support lock cylinder 222, allowing the stacked tile to come down into contact with the discharge conveyor belt 66 which moves the stacked tile from the stacking and squaring section.

As the stack is conveyed clear of the discharge gate two functions are affected by the moving stack. The limit switch LS-1 is closed, causing the return of the relay CR-1 to its initial position. This action de-energizes the block gate solenoid 211 and energizes the advance solenoid 205a of the discharge gate cylinder, thereby closing the discharge gate 200.

At the same time, roller operated valve R.O.V. 3 is actuated, affecting the retraction of the finger support cylinder, raising the fingers in the squaring and stacking section. After being instantaneously raised to its full extent, the finger support cylinder begins to fall, but falls slowly due to the restraining action of the "hydro-chek" 215a. After the support finger cylinder is retracted, roller operated valves R.O.V. 1, 2 and 4 are actuated, accomplishing the remaining actions necessary to return the circuit to the starting position.

Roller operated valve R.O.V. 1, opened, supplies a short blast of unlubricated, double filtered air to the lenses of the counting photocell elements for cleaning purposes. The actuation of roller actuated valve R.O.V. 2 extends the finger support cylinder lock 229, serving to limit the fall of the finger support to a position within about ¼" of the belt 66. The actuation of roller operated valve R.O.V. 4 actuates the two way valve 346 further advancing the finger support cylinder 215, and lowering the fingers against the parallel, coupled "hydro-chek" 215a as soon as the finger lock is released upon completion of a count. The operation of roller operated valve R.O.V. 3 returns this two way double pilot operated valve to its normal block position.

The operation of the elevation and packing sections will now be described:

Air is supplied from a flexible coupling from the counting and stacking section. The coupling actuates the elevator jack cylinders 311 in the same manner as in the preceding section. These jacks may be located in any desired suitable positions. As the counted stack moves onto the elevator platform 257, it will engage the suppressor or adjustable breaking mechanism 267. A cam on the suppressor support 263 triggers roller operated valve R.O.V. 7, actuating the retract stroke of the elevating cylinder 271. The tile stack is moved by gravity from the elevating platform 257 over the inclined elevator 280 onto the packing conveyor 303. The movement of the stack triggers roller operated valve R.O.V. 10 after the stack clears the elevating platform. This valve advances the elevator cylinder, lowering the elevator to the normal loading position. At the end of the packing conveyor, a packing station is positioned. The operator manually moves the nearest stack onto the packing platform 303 against the fixed stop 305 which disappears as the stack is raised. The manually operated foot valve 301a, when actuated, advances the platform operating cylinder 303 to enable the operator to pull a box over the tile and tip it off onto a gravity feed conveyor (not shown) en route to a sealing box machine (not shown).

The counted stack continues to be moved by the belts 66 past limit switch LS-1 and moves to an elevator 235, shown in Figs. 1 and 28. The elevator 235 comprises a frame 236 having lower horizontal portions 237, intermediate portions 238 and top portions 239. These are interconnected by end vertical struts 240, 241. An intermediate vertical strut 242 interconnects the lower portions 237 with the intermediate portions 238. Interconnecting vertical struts 242 with the front vertical struts 240 are horizontal beams 244 carrying parallel horizontal bearings 245 and 246. In bearing 245 is journalled shaft 248, and bearing 246 is journalled the shaft 249. Pivoted on shaft 249 is a lever 250 having a weight 251 at its rear end. Pivoted to the shaft 248 is a lever 252. Supported at the lower ends of the levers are bearings 253 and 254 journalling parallel horizontal shafts 255 and 256.

It will be noted that the distance separating the horizontal shafts 248, 249 is the same as the distance separating the horizontal shafts 256, 255. Mounted on the bearings 253, 254 is an elevator frame 257 supporting rollers 258. At the rear end of the frame 257 is a stop 259.

In the position shown in Fig. 28, elevator 257 is lowered and is in position to receive a stack of tiles from the belts 66. On shaft 248 is a pulley 260. Mounted on the beams 244 and therebeneath, is a pulley 261. Slidably mounted in a suitable bushing 262 on the frame is a horizontal longitudinal retarder 263. At the rear end of the retarder 263 is a roller 264. Fixed to the frame and extending downwardly at an inclined direction thereof is a finger 265.

Attached to the finger is one end of a flexible cable 266. The flexible cable 266 engages the rear of the roll or pulley 264 and passes around the pulley 260 and over the pulley 261, then extends downwardly and attached to the lower end thereof is a weight W. At the forward end of the retarder 263 is a striker plate 267. The striker plate 267 is aligned with the forward end of the front of the elevator frame 240. Thus, when the stack of tiles moves onto the lowered elevator, the striker plate 267 may be engaged and the retarder 263 may be pushed back, lifting the weight W. Near the rear end of the stroke of the retarder 263 a roller operated valve R.O.V. 7 (Figs. 30, 31) is actuated, as shown in Fig. 28. Mounted on the frame 236, as shown in Fig. 28, is a pivot bracket 270. Pivoted thereto is an air operated cylinder 271 from which extends a piston rod 272. Fixed to the shaft 274 is an arm 273. The forward end of the piston 272 is pivoted as at 274 to the arm 273. Pivoted to the upper end of the arm 273 is a link 275. Fixed to the shaft 248 is an arm 276 parallel to the arm 273. The link 275 interconnects the outer ends of the arms 273, 276 being pivoted thereto as at 277 and 278, respectively. The arm 252 is fixed to the shaft 248. The air operated cylinder 271 is controlled by said roller operated valves R.O.V. 7 and R.O.V. 10, as will appear hereinafter, for raising and lowering the elevator. When the elevator is raised, it will move to the dot-dash position shown in Fig. 28, substantially at the level of the top frame portions 239. The top frame portions 239 carry a series of rollers 280 and are somewhat inclined downwardly to the left.

It will now be understood that the elevator unit 235 receives the counted and squared stack from the discharge conveyor of the stacking unit onto the elevating platform 258. The counted and squared stack entering the platform is decelerated as follows:

The stack strikes the retarder 263 whose resistance varies approximately as the cosine function of the forward travel and whose magnitude is dependent upon the variable weight W acting through the flexible cable 266 trained around the pulleys 261, 260 and 264. The retarder 263 is run as in retarded position, by a silent type ratchet 290.

As the retarder 263 nears its retracted position, roller operated valve R.O.V. 7 is engaged, to a platform 258, as will be explained hereinafter. The weighted stack of tile is accelerated by gravity onto the inclined or tilted gravity conveyor 280. This slope may be adjustable. As the stack of tile travels along the conveyor 280, roller operated valve R.O.V. 10 (Figs. 30, 31) is actuated, to cause the elevator air cylinder to return the elevating platform 257 downwardly to its normal position in the manner hereinafter explained.

As the elevating platform returns, a roller 291 on said platform trips lever 292, releasing the ratchet 290, thus allowing the retarder 263 to move forwardly and return to its normal position. The lever 292 is pivoted to the frame in any suitable manner and has one finger 292a adapted to engage a notch in the ratchet 290 to keep it in position for providing the forward return of the retarder until the rear end of the lever is tripped by the roller 291 to release the ratchet.

The frame 236 has a rearward extension 300 supporting an air cylinder 301 provided with a piston 302 carrying at the upper end thereof a platform 303 provided with rollers 304. As the tile stack rolls by gravity over the rollers or platform 280, the stack will ride onto the platform 303 and come to against a stop 305 on the frame. The operator may then manually energize the upstroke of the lift cylinder 301, by pressing a treadle operated valve 301a thus lifting the platform 303 to the dot-dash line position shown in Fig. 28. The stack of tile will then be in packing position. A carton or box may be fitted over the stack. The operator then operates valve 301 to cause the lift cylinder 301 to return the platform 303 downwardly to its normal position. The packaged stack may then be manually tipped from raised position on the pack station onto a gravity roller conveyor to a box sealing machine.

It will thus be seen that there is provided an article and process in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention we claim as new and desire to secure by Letters Patent:

1. In combination, conveyor means, means to continuously feed tile to a level above the conveyor means to allow said tiles to drop onto said conveyor means at an accumulator station to form a stack, means to hold back all the tile in the stack at the accumulator station, except one or more lowermost tile or tiles, so that the conveyor may move said lowermost tile or tiles from under the stack allowing the remainder of the tiles in the stack to drop onto said conveyor means, block means adapted, in one position thereof, to permit the lowermost tile or tiles to be moved out from the bottom of the stack on said conveyor means, and in another position thereof to block the tile or tiles from being moved by said conveyor means, means to count the tile moved by said conveyor means as they are moved out of said accumulator station by said conveyor means when said block means is in its first position, and means controlled by said counting means to move said block means to its second position to block movement of tiles by said conveyor, when a predetermined count is reached.

2. The combination of claim 1, in combination with a second conveyor means adapted to receive the tiles deposited thereon from the first conveyor means, means at the second conveyor to retain the tiles deposited on the second conveyor against movement, to permit said tiles to stack up, and means controlled by said counting means to move said retaining means away from retaining position to permit the stack of tiles to be moved by the second conveyor.

3. The combination of claim 2, in combination with supporting means adapted to be raised above the second conveyor to lift the deposited tiles out of contact with respect to the second conveyor means, and means controlled by the counting means to lower said lifting means whereby to permit the stack of tiles to come down onto the second conveyor means, so that said stack may be moved by said second conveyor means when said retaining means is moved away from retaining position.

4. The combination of claim 3, and means controlled by movement of a stack of tiles by said second conveyor means to raise said lifting means, move said retaining means back to retaining position, and move the blocking means to its first position.

5. The combination of claim 4, in combination with elevator means located to receive a stack of tiles from the second conveyor means, and means controlled by movement of a stack of tiles from the second conveyor means onto said elevator means for elevating said elevator means to an elevated position.

6. The combination of claim 5, in combination with an inclined platform positioned to receive a stack of tiles from the elevated elevator means, and means controlled by passage of a stack on said inclined platform for lowering said elevator means.

7. The combination of claim 6, in combination with a packing platform adapted to receive a stack of tiles from the inclined platform, and means for raising the packing platform and for lowering the same.

8. In combination, means for continuously feeding tiles onto a conveyor at an accumulator station, one at a time, to form a stack, means to retain the stack of tiles at the accumulator station, said retaining means including means to release the lowermost tile in the stack one at a time to permit the conveyor to move said lowermost tiles one at a time from the stack, a second conveyor, a stacking station at said second conveyor, said first conveyor being adapted to move the tiles from the accumulator station to the stacking station to stack the tiles at said station, fingers movable from below the second conveyor to above the second conveyor at the stacking station to support the stack of tiles at said station, a discharge gate at the stacking station to retain the stack of tiles in the stacking station from moving out of said station, means to count the tiles as they pass from the accumulator station to the stacking station, releasable block means to prevent movement of tiles from the accumulator station to the stacking station, and means controlled by the counting means to actuate the block means and raise the discharge gate and lower the fingers whereby to permit the stack of tiles at the stacking station to come down onto the second conveyor and be moved thereby out of the stacking station while further passage of tiles from the accumulator station to the stacking station is blocked by said actuated block means.

9. The combination of claim 8, in combination with vibrating means for squaring the stack of tiles at the stacking station.

10. The combination of claim 8, in combination with means controlled by passage of the stack of tiles out of said stacking station to lower the discharge gate, raise the supporting fingers and release the block gate so that the first conveyor may again move tiles from the accumulator station to the stacking station.

11. The combination of claim 8, in combination with means controlled by the upward movement of the supporting fingers to lock said fingers against downward movement, and means controlled by the rising discharge gate for releasing said finger locking means.

12. A machine of the character described, comprising a first conveyor, a second conveyor, a third conveyor arranged to continuously carry tile to the first conveyor, means for continuously feeding tile to the third conveyor, means to guide tiles moved by the third conveyor onto the first conveyor at an accumulator station to form a stack, means to feed the tile individually from the bottom of the stack at the accumulator station to a stacking station over the second conveyor, means to count the tile as it is moving from the first conveyor to the second conveyor, and means to stop the movement of tile from the first conveyor to the second conveyor when a pre-set count is reached by said counting means.

13. In combination, a horizontal conveyor adapted to support a stack of tiles, a plate disposed above the conveyor and at right angles thereto, and transversely of said conveyor, means to support said plate for vertical movement, and means to retain the plate at various heights above the conveyor to regulate the thickness of articles that may be moved by the conveyor and which may pass beneath said plate from the bottom of the stack, in combination with a block gate adjacent said plate to retain articles on said conveyor against movement by said conveyor beneath said plate, said gate being movable upwardly to a position to permit tiles passing beneath said plate to be moved by said conveyor, means to count the tiles moved by said conveyor beneath said plate and out from the bottom of the stack, and means controlled by said counting means to move said block gate downwardly to a position blocking articles against movement by said conveyor.

14. The combination of claim 13, a second conveyor to receive counted tiles from the first conveyor, a vertical discharge gate above said second conveyor at a stacking station, and supporting means adapted to retain tiles moved from the first conveyor to the second conveyor, at a level above the second conveyor to prevent the second conveyor from contacting the tiles at the stacking section.

15. The combination of claim 14, and means controlled by said counting means for lowering said supporting means and raising the discharge gate to permit the stack of tiles at the stacking section to drop onto the second conveyor and to be moved by the second conveyor out of the stacking section.

16. The combination of claim 15, and means controlled by movement of the stack of tiles out of the stacking station, to again lift the supporting means, lower the discharge gate and move the block gate upwardly from its blocking position.

17. In combination, a conveyor, a support movable from a position below said conveyor to a position above said conveyor to support tile stacked on said support when the latter is in said raised position, means for stacking tile one at a time onto said support to form a stack, means to count the tile stacked on said support, discharge means located above the conveyor and beyond said support and in the path of the stack of tiles, and means controlled by the counting means for moving the discharge means out of the path of the stack of tiles, and to lower the support means whereby to lower the counted stack of tiles onto the conveyor, and means for moving the conveyor for moving the stack of tiles past said moved discharged means, said support and discharge moving means comprising an air cylinder to control the movement of said support, an air discharge cylinder to control the movement of the discharge means, roller operated valves controlling the operation of the cylinder for controlling the support, a solenoid valve for controlling the operation of the discharge cylinder, in combination with, means to lock the support means against movement, a lock cylinder for controlling said lock means, and roller operated valves to control the operation of said lock cylinder.

18. In a machine of the character described, a first conveyor, a second conveyor disposed therebelow, means for feeding tiles to the first conveyor at an accumulator station, a block gate movable into the path of movement of the lowermost of the accumulated tiles on said first conveyor, said block gate being movable out of the path of said lowermost tile, a cylinder for affecting such movement, a solenoid to control said cylinder, said first conveyor being adapted to move tiles onto said second conveyor at a stacking station, a discharge gate above the second conveyor at said stacking station to retain the tiles against movement, an air cylinder to operate said discharge gate, a first solenoid controlling the cylinder for moving the discharge gate into the path of tiles deposited on the second conveyor, a second solenoid controlling said discharge cylinder for moving said discharge gate into the path of such tiles, means to count the number of tiles passing from the first conveyor to the second conveyor, a relay controlled by said counting means, a switch controlled by said relay including means to energize the block gate solenoid, and the second solenoid of the discharge cylinder when a pre-set count has been reached on the counter, switch means to retain the first solenoid of the discharge cylinder closed during the counting period, and means controlled by reaching of the pre-set count to open the last switch, whereby to deenergize the first discharge gate solenoid, the arrangement being such that the switch means controlling the block gate solenoid and the second solenoid for the discharge gate solenoid are open during the counting period.

19. The combination of claim 18, and means controlled by movement of the tiles by said conveyor out of said stacking position including a limit switch in the path of such stack of tiles to deenergize the counter relay, for opening the block gate solenoid controlling switch and the switch controlling the second solenoid of the discharge gate cylinder, and for closing the switch controlling the first solenoid of the discharge gate cylinder.

20. The combination of claim 19, in combination with a support at the stacking station, an air cylinder for raising and lowering the support, said support being adapted when raised, to lift the stack of tiles at the stacking station above the second conveyor, and a roller operated valve adapted when actuated to actuate the cylinder for raising the support, and a second roller operated valve adapted, when actuated, to lower the finger support.

21. The combination of claim 20, in combination with releasable means to lock the support in raised position, a cylinder for actuating the support lock, a roller operated valve to actuate the lock cylinder for locking the support, and a second roller operated valve for controlling the lock cylinder for moving the lock into a support releasing position.

22. The combination of claim 20, the first roller operated valve being positioned beyond the discharge gate to be actuated by the stack of tiles leaving the stacker position, the second roller operated valve being positioned to be actuated by the fully raised finger support.

23. The combination of claim 22, the first roller operated valve of the lock cylinder being positioned to be actuated by the raised support, and the second roller operated valve of the lock cylinder being positioned to be actuated by the discharge gate as the latter moves away from stack blocking position.

24. In combination, conveyor means adapted to support a stack of tiles thereon at an accumulator station, means to hold back all but the lowermost tile in the stack at said accumulator station, block means adapted in one position thereof to permit tile to be moved out from the bottom of the stack by said conveyor means, one at a time, and in another position thereof to block the tile from being moved by said conveyor means, means to count the tile moved by said conveyor means as they are moved out of said accumulator station by said conveyor means, when said block means is in its first position, and means controlled by said counting means to move said block means to its second position to block movement of tiles by said conveyor, when a predetermined count is reached.

References Cited in the file of this patent

UNITED STATES PATENTS

| | | |
|---|---|---|
| 118,475 | Ojeda | Aug. 29, 1871 |
| 2,133,259 | Wolff | Oct. 11, 1938 |
| 2,251,293 | Schwartz | Aug. 5, 1941 |
| 2,424,093 | Harred | July 15, 1947 |
| 2,506,550 | Morrison | May 2, 1950 |
| 2,540,972 | Wagner et al. | Feb. 6, 1951 |
| 2,606,483 | Forbes | Aug. 12, 1952 |
| 2,666,638 | Taylor | Jan. 19, 1954 |
| 2,678,151 | Geisler | May 11, 1954 |
| 2,761,361 | Hornberger et al. | Sept. 4, 1956 |